March 14, 1967  C. F. HINSHAW  3,308,953
SEPARATOR FOR LIQUIDS OF DIFFERENT SPECIFIC GRAVITIES
Filed July 17, 1964
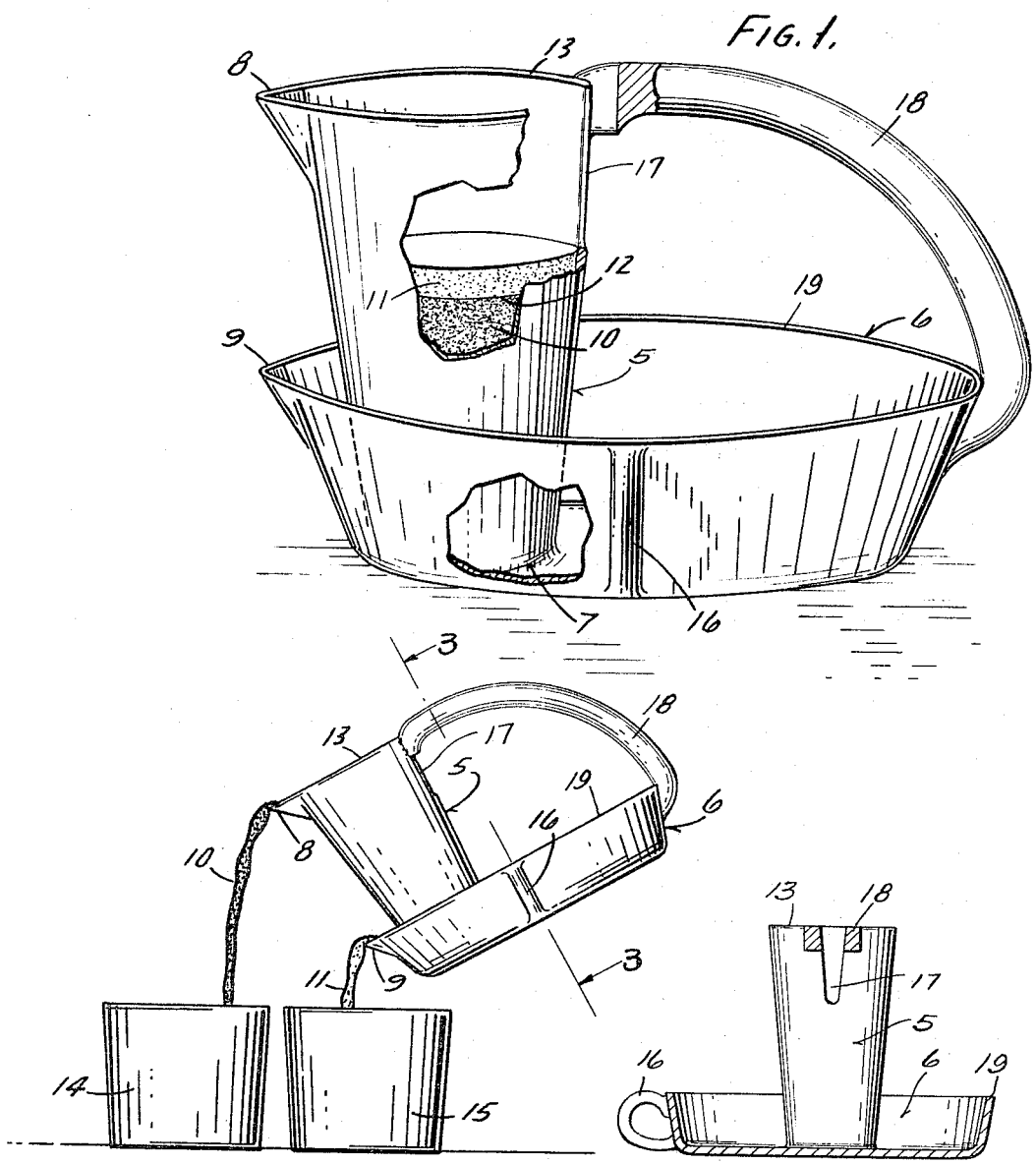
INVENTOR.
CARL F. HINSHAW
BY
Wheeler, Wheeler & Wheeler
ATTORNEYS.

United States Patent Office 3,308,953
Patented Mar. 14, 1967

3,308,953
SEPARATOR FOR LIQUIDS OF DIFFERENT
SPECIFIC GRAVITIES
Carl F. Hinshaw, Lake of the Hills,
Lake Wales, Fla. 33853
Filed July 17, 1964, Ser. No. 383,362
7 Claims. (Cl. 210—83)

This invention relates to improvements in separators and particularly to a device to separate liquids of different specific gravities.

The device of the present invention is particularly intended to separate grease from gravy or broth, although it is adapted for use in separating other liquids of different specific gravity. In accordance with the present invention, one container or vessel is fastened into another container or vessel so that the two containers are unitary and liquid overflow from the inside container will be collected in the outside container. The vessels are desirably transparent to facilitate visual observation of their contents and the liquid level thereof. The inside container is desirably tall and narrow and the outside container is desirably low and wide, as shown in the drawings.

To separate grease from gravy or broth after roasting meat, for example, the combined liquids are poured into the inside container. The grease will separate from the broth or gravy because of the different specific gravities of the liquids. The grease will rise to the top of the inside vessel. The line of separation between the two liquids is readily observable through the transparent side wall of the inside vessel.

The combined liquids are poured from the roast pan until the grease overflows the inside container into the outside container. In preferred embodiments of the invention, the inside container has its wall notched downwardly to form an overflow aperture confining the grease overflow to the notched part of the inside container. As soon as the line of separation between the two liquids reaches the bottom of the notch in the wall of the inside container, pouring into the inside container is discontinued. At this point all of the grease is in the outside container and the broth or gravy is in the inside container.

In preferred embodiments of the invention, the inside container is taller than the outside container and is offset toward the edge of the outside container and both are provided with pouring spouts. This facilitates pouring concurrently from both containers into separate receptacles, one for the grease and one for the broth or gravy.

Other objects, features and advantages of the invention will appear from the following disclosure in which:

FIGURE 1 is a perspective view of a separator embodying the present invention.

FIGURE 2 is a side elevation illustrating pouring simultaneously from the separator into the separate receptacles for the two liquids.

FIGURE 3 is a cross section taken along the line 3—3 of FIGURE 2.

Although the disclosure hereof is detailed and exact to enable those skilled in the art to practice the invention, the physical embodiments herein disclosed merely exemplify the invention which may be embodied in other specific structure The scope of the invention is defined in the claims appended hereto.

The inside container 5 which is desirably tall and narrow and the outside continer 6 which is desirably low and wide are preferably made of transparent material such as plastic or glass. Where hot liquids are to be handled, Pyrex glass is preferred. The bottom wall of the tall narrow container 5 is fused or adhesively connected to the bottom of the low wide container 6 as shown at 7. Accordingly, container 5 is nested within container 6 in spaced relation to the wall thereof. Container 6 may optionally be provided with a handle 16.

As indicated in the drawings, the preferred construction involves the asymmetric nesting of the containers, by offsetting container 5 away from the center of container 6 and toward the side or margin of container 6, thus to facilitate simultaneously pouring from both vessels, as shown in FIGURE 2. For this purpose both vessels 5 and 6 are provided with pouring spouts 8, 9. Spouts 8, 9 are in vertically spaced relation, as shown in FIG. 1, when both containers are upright.

In preferred embodiments of the invention, the wall of inside container 5 is provided with a downwardly tapered overflow aperture or notch 17 which is arcuately spaced 180° from spout 8. The bottom of the notch 17 is above the level of the top rim 19 of the outside container 6. Notch 17 faces the edge of container 6 away from which the inside container 5 is offset. A handle 18 connects the respective rims 13, 19 of containers 5 and 6.

When mixed liquids of different specific gravities are poured into container 5, the liquid 10 of heavier specific gravity will separate from the liquid 11 of lighter specific gravity and there will ordinarily be a clearly observable line 12 of demarcation therebetween. As the mixed liquids continue to be poured into container 5, the liquid level will rise and liquid 11 will ultimately overflow into container 6 through overflow means. In preferred embodiments the overflow is through notch 17, which confines the flow to the back of the container 5. Where no notch 17 is provided, the overflow is over the top rim 13 of container 5, which also consitutes overflow means.

When the line 12 reaches the level of overflow of vessel 5, namely the bottom of notch 17 in the disclosed embodiment, pouring into vessel 5 is discontinued. At this point all of liquid 11 is in vessel 6 and vessel 5 contains only the liquid 10. Liquid 10 will be spaced from the top rim 13 of vessel 5 because of the notch 17, thus enabling the vessel 5 to be tipped considerably as shown in FIGURE 2 before liquid will start to pour out of the spout 8.

The liquids in the respective vessels 5 and 6 are desirably poured concurrently into receptacles 14, 15 as shown in FIGURE 2 for separate disposition of the respective liquids. For this purpose the combined vessels 5, 6 are lifted by handle 18. Inasmuch as notch 17 is displaced 180° from pouring spout 8, it does not interfere with pouring from spout 8.

If any unseparated liquids remain to be separated, the procedure is repeated until all of the liquids are separated. If there is not enough unseparated liquid remaining to fill container 5 up to the level of the bottom of notch 17, previously separated liquid in receptacle 14 may be repoured into receptacle 5 to complete the separation.

The separator of the present invention is particularly useful as a kitchen utensil for separating grease from gravy or broth. The combined vessels 5, 6 may easily be washed and stored and occupy little space in a kitchen cabinet.

I claim:
1. A device for separating liquids of different specific gravity compirising:
an outside container,
an inside container,
means fastening said inside container into said outside container and overflow means for overflowing liquid of low specific gravity from the inside container into the outside container while retaining high spe- cific gravity liquid in the inside container to separate said low from said high specific gravity liquid. and a handle on the fastened containers for concurrently pouring their respective contents into separate receptacles by tipping said containers.

2. A device for separating liquids of different specific gravity comprising:
an outside container,
an inside container,
and means fastening said inside container into said outside container and overflow means for overflowing liquid of low specific gravity from the inside container into the outside container while retaining high specific gravity liquid in the inside container, to separate said low from said high specific gravity liquid and wherein
said inside container is high and narrow and said outside container is low and wide and includes a peripheral margin, said inside container being offset toward the margin of said outside container to facilitate simultaneous pouring from said containers into separate receptacles.

3. The device of claim 2 in which both said containers have pouring spouts substantially vertically aligned.

4. A method of separating liquids of different specific gravity comprising the steps of pouring commingled liquids into the inside one of two nested containers to cause the liquid of lower specific gravity to separate from the liquid of higher specific gravity and rise toward the top of said inside container, and continuing to pour into said inside container to overflow said liquid of lower specific gravity into the outer of said two nested containers until substantially all of said separated liquid of lower specific gravity has overflowed into said outer container, plus the step of pouring simultaneously from said one and another containers into separate receptacles for said liquids of different specific gravity.

5. A device for separating liquid of different specific gravity comprising:
a low wide outside container having a peripheral margin,
a high narrow inside container,
said inside container having a side wall with an overflow aperture therein,
means fastening said inside container into said outside container, said overflow aperture providing for overflow of liquid of low specific gravity from the inside container through said overflow aperture into the outside container while retaining high specific gravity liquid in the inside container to separate said low from said high specific gravity liquid.

6. A device for separating liquid of different specific gravity comprising:
a low wide outside container having a peripheral margin,
a high narrow inside container,
said inside container having a side wall with an overflow aperture therein,
and means fastening said inside container into said outside container, said overflow aperture providing for overflow of liquid of low specific gravity from the inside container through said overflow aperture into the outside container while retaining high specific gravity liquid in the inside container to separate said low from said high specific gravity liquid said containers having pouring spouts at corresponding sides thereof, said overflow aperture being arcuately displaced approximately 180° from said pouring spouts.

7. The device of claim 6 in which said inside container is offset toward the margin of said outside container to facilitate pouring from said inside container into a separate receptacle.

References Cited by the Examiner
UNITED STATES PATENTS

| | | | |
|---|---|---|---|
| 649,294 | 5/1900 | Gallaway | 210—532 X |
| 2,287,156 | 6/1942 | White | 210—514 X |
| 2,419,666 | 4/1947 | Werth | 210—532 |
| 3,227,167 | 1/1966 | Parent, Jr. | 210—532 X |

REUBEN FRIEDMAN, *Primary Examiner.*

D. M. RIESS, *Assistant Examiner.*